United States Patent
Harandi (10) Patent No.: US 10,703,984 B2
(45) Date of Patent: Jul. 7, 2020

(54) FLUIDIZED COKING WITH OXYGEN-CONTAINING STRIPPING GAS

(71) Applicant: ExxonMobil Research and Engineering Company, Annandale, NJ (US)

(72) Inventor: Mohsen N. Harandi, New Hope, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 40 days.

(21) Appl. No.: 16/185,054

(22) Filed: Nov. 9, 2018

(65) Prior Publication Data
US 2020/0148960 A1 May 14, 2020

(51) Int. Cl.
*C10G 9/32* (2006.01)
*C10B 47/14* (2006.01)
*C10G 9/00* (2006.01)
*C01B 3/04* (2006.01)
*C10B 57/14* (2006.01)
*C10B 55/10* (2006.01)
*C10B 47/24* (2006.01)
*C10B 57/16* (2006.01)

(52) U.S. Cl.
CPC .................. *C10G 9/32* (2013.01); *C01B 3/04* (2013.01); *C10B 47/24* (2013.01); *C10B 55/10* (2013.01); *C10B 57/14* (2013.01); *C10B 57/16* (2013.01); *C10G 9/005* (2013.01); *C10G 2300/1044* (2013.01); *C10G 2300/708* (2013.01)

(58) Field of Classification Search
None
See application file for complete search history.

(56) References Cited

U.S. PATENT DOCUMENTS

| | | | |
|---|---|---|---|
| 3,661,543 A | 5/1972 | Saxton | |
| 3,702,516 A | 11/1972 | Luckenbach | |
| 3,759,676 A | 9/1973 | Lahn | |
| 3,816,084 A | 6/1974 | Moser et al. | |
| 4,213,848 A | 7/1980 | Saxton | |
| 4,269,696 A | 5/1981 | Metrailer | |
| 5,284,574 A * | 2/1994 | Chen | C10G 9/32 208/126 |
| 5,472,596 A | 12/1995 | Kerby et al. | |
| 8,101,066 B2 * | 1/2012 | Siskin | C10B 55/10 208/125 |
| 9,670,417 B2 | 6/2017 | Du et al. | |

\* cited by examiner

*Primary Examiner* — Derek N Mueller
(74) *Attorney, Agent, or Firm* — Hsin Lin (57) ABSTRACT

Systems and methods are provided for using an oxygen-containing gas as at least part of the stripping gas for the stripping zone or section in a fluidized coker. By using an oxygen-containing gas as the stripping gas, heat can be added to the stripping zone selectively based on combustion of coke and/or hydrocarbons with the oxygen in the stripping gas. This can allow the temperature of the stripping zone to be increased relative to the temperature of the coking zone of a fluidized coking system. The flow of oxygen can be controlled to achieve a desirable temperature in the stripper while the reactor temperature is independently set by preheating of the feed and/or hot coke circulation to the reaction zone.

20 Claims, 3 Drawing Sheets

FLUIDIZED COKING WITH OXYGEN-CONTAINING STRIPPING GAS

FIELD

Systems and methods are provided for performing fluidized coking while using air or another oxygen-containing gas as at least a portion of the stripping gas.

BACKGROUND

Coking is a carbon rejection process that is commonly used for upgrading of heavy oil feeds and/or feeds that are challenging to process, such as feeds with a low ratio of hydrogen to carbon. In addition to producing a variety of liquid products, typical coking processes can also generate a substantial amount of coke. Because the coke contains carbon, the coke is potentially a source of additional valuable products in a refinery setting. However, fully realizing this potential remains an ongoing challenge.

Coking processes in modern refinery settings can typically be categorized as delayed coking or fluidized bed coking. Fluidized bed coking is a petroleum refining process in which heavy petroleum feeds, typically the non-distillable residues (resids) from the fractionation of heavy oils are converted to lighter, more useful products by thermal decomposition (coking) at elevated reaction temperatures, typically about 480° C. to 590° C., (about 900° F. to 1100° F.) and in most cases from 500° C. to 550° C. (about 930° F. to 1020° F.). Heavy oils which may be processed by the fluid coking process include heavy atmospheric resids, petroleum vacuum distillation bottoms, aromatic extracts, asphalts, and bitumens from tar sands, tar pits and pitch lakes of Canada (Athabasca, Alta.), Trinidad, Southern California (La Brea (Los Angeles), McKittrick (Bakersfield, Calif.), Carpinteria (Santa Barbara County, Calif.), Lake Bermudez (Venezuela) and similar deposits such as those found in Texas, Peru, Iran, Russia and Poland.

Flexicoking process is described in patents of Exxon Research and Engineering Company, including, for example, U.S. Pat. No. 3,661,543 (Saxton), U.S. Pat. No. 3,759,676 (Lahn), U.S. Pat. No. 3,816,084 (Moser), U.S. Pat. No. 3,702,516 (Luckenbach), U.S. Pat. No. 4,269,696 (Metrailer). A variant is described in U.S. Pat. No. 4,213,848 (Saxton) which introduces a stream of light hydrocarbons from the product fractionator into the reactor instead of the stream of hot coke particles from the heater. Another variant is described in U.S. Pat. No. 5,472,596 (Kerby).

One of the difficulties with operating a fluidized coker is selecting a desirable temperature profile for both the coking section and the stripping section of the reactor. Conventionally, hot coke from a heater or gasifier is usually returned to the coking section to provide at least part of the heat for the coking process. Due in part to the endothermic nature of both the coking and the stripping process, the stripping section in a conventional reactor typically operates at a lower temperature than the coking section. This is often the reverse of what would be desirable from a yield standpoint. The yield of liquid products from the coking section tends to increase as the coking temperature is decreased. However, due to the need to reduce or minimize coking within the stripping section, the temperature of the coking section is typically selected to provide a sufficiently high temperature in the stripping section.

U.S. Pat. No. 9,670,417 provides an example of a configuration designed to allow a stripping section of a fluidized coking reactor to operate at a lower temperature than the coking section. Due to substantial recirculation from the stripping zone to the coking zone, simply providing heated particles to the stripping zone can tend to result in heating of both the coking zone and the stripping zone. The configuration in U.S. Pat. No. 9,670,417 provides an annular baffle between the coking and stripping zone to reduce or minimize this mixing. In combination with the additional piping to provide heated coke particles to both the coking zone and the stripping zone, this configuration is described as being suitable for having a stripping zone temperature that is greater than the coking zone temperature.

It would be desirable to have methods for separately controlling the temperature in the stripping zone and the coking zone. Additionally, it would be desirable for such methods to allow for operating the stripping zone at a higher temperature than the coking zone while still achieving a yield benefit for the liquid products generated from the fluidized coking system.

SUMMARY

In various aspects, a method for performing fluidized coking is provided. The method includes exposing a feedstock comprising a T10 distillation point of 343° C. or more to a first portion of a fluidized bed including solid particles in a coking zone of a reactor under thermal cracking conditions to form a 343° C.-liquid product. The thermal cracking conditions can be effective for depositing coke on the solid particles. An oxygen-containing stream can be introduced into a stripping zone of the reactor, where the stripping zone includes a second portion of the fluidized bed. The oxygen-containing stream can be introduced under stripping conditions to oxidize at least a first portion of the deposited coke. A stripping temperature of the stripping conditions can be greater than a cracking temperature of the thermal cracking conditions. At least a portion of the solid particles comprising deposited coke can be passed from the reactor to at least one of a gasifier and a burner. The at least a portion of the solid particles comprising deposited coke can then be exposed to oxidation conditions in the at least one of a gasifier and a burner to form partially oxidized coke particles and a gas phase product comprising CO and $CO_2$. At least a first portion of the partially oxidized solid particles can be removed from the at least one of a gasifier and a burner, while at least a second portion of the partially oxidized solid particles can be passed into the coking zone of the reactor. Optionally, the solid particles can correspond to coke particles.

DETAILED DESCRIPTION

All numerical values within the detailed description and the claims herein are modified by "about" or "approximately" the indicated value, and take into account experimental error and variations that would be expected by a person having ordinary skill in the art.

Overview

In various aspects, systems and methods are provided for using an oxygen-containing gas as at least part of the stripping gas for the stripping zone or section in a fluidized coker. Air is an example of a suitable oxygen-containing gas. By using an oxygen-containing gas as the stripping gas, heat can be added to the stripping zone selectively based on combustion of coke and/or hydrocarbons with the oxygen in the stripping gas. The reaction of oxygen with coke and/or other hydrocarbons present in the stripping section is sufficiently fast and sufficiently exothermic to allow for a significant temperature rise in the stripping zone. This can allow the temperature of the stripping zone to be increased relative to the temperature of the coking zone of a fluidized coking system. The flow of oxygen can be controlled to achieve a desirable temperature in the stripper while the reactor temperature is independently set by preheating of the feed and/or hot coke circulation to the reaction zone. In some preferred aspects, the reactor temperature can be 5° F. (~3° C.) or more below the stripper temperature, such as 10° F.-40° F. (~5° C.-22° C.) below the stripper temperature.

Some benefits of using an oxygen-containing gas as the stripping gas are related to improved yield and reduced equipment complexity. The ability to operate the stripping zone at a temperature above the temperature of the coking zone can result in improved yield of liquid products, such as a net $C_{5+}$ liquid product yield increase of 1.0 wt % or more relative to the weight of the input feed to the coker. Additionally, this yield benefit can be achieved without requiring specialized internal structures in the coking reactor and/or without requiring multiple hot coke transfer lines to provide hot coke to both the coking zone and the stripping zone of the fluidized coker. In some aspects, use of oxygen-containing gas as part of the stripping gas can be implemented in an existing coker unit without requiring turnaround work and/or shutdown of the coker unit, as the modifications for implementing use of oxygen-containing gas in the stripping gas can be performed during coker operation.

In some instances, certain benefits of using an oxygen-containing gas as the stripping gas may be difficult to achieve with conventional methods. For example, one of the constraints on fluidized coking systems is the size (diameter) of the burner, gasifier, or other structure for oxidizing coke to generate heat. The size of the burner or gasifier can affect the amount of heat that can be generated for maintaining heat balance in the fluidized coking system. This amount of available excess heat provides a limit on how much feed can be processed in the fluidized coking system. By using an oxygen-containing stripping gas, a portion of the heat for the reactor can be generated in the stripping zone of the reactor. This represents an additional heat source independent of the burner or gasifier, which can therefore allow additional feed to be processed (coked) in the reactor. Alternatively, if desired, the fluidized coking system can be operated to burn the same total amount of coke when using an oxygen-containing stripping gas, so that the resulting benefit is the ability to selectively add heat to the stripping zone. In some preferred aspects, the air blower size will not be increased when using oxygen-containing gas as the stripping gas, as compared to the air blower size for conventional stripping with steam. Optionally, a common air blower can be used for providing air (oxygen) to the burner or regenerator and for providing air (oxygen) to the stripping zone. In such aspects, the total coke burn when including oxygen in the stripping gas can be approximately constant relative to a conventional configuration where steam is the stripping gas. In such aspects, the inclusion of oxygen in the stripping gas can represent a shift in location for where coke burning occurs within the coking system. However, it is noted that better stripping can result in less hydrocarbons being burned as coke, so that somewhat less air compression may be required. It is also noted that another potential benefit of including oxygen in the stripping gas can be the reduction or elimination of steam usage in the stripping section. This can reduce or minimize the amount of sour water production.

In some aspects, using an oxygen-containing gas as at least a portion of the stripping gas can allow the temperature of the stripping zone to 3° C. to 10° C. greater than the temperature of the coking zone, or 3° C. to 14° C. greater, or 3° C. to 20° C. greater, or 5° C. to 22° C. greater. In other aspects, larger temperature differences can be achieved, such as having a temperature for the stripping zone that is 3° C. to 60° C. greater than the temperature of the coking zone, or 15° C. to 60° C. greater, or 25° C. to 60° C. greater, or 15° C. to 40° C. greater, or 25° C. to 40° C. greater. The difference in temperature in the stripping zone versus the coking zone can be controlled at least in part by the amount of oxygen that is delivered to the stripping zone with the oxygen-containing gas. This can be characterized based on the weight of oxygen introduced in the stripping gas versus the weight of feedstock introduced into the coking zone. In various aspects, the molar flow rate of oxygen introduced with the stripping gas can correspond to 0.001% to 15.0% of the molar flow rate of fresh feedstock introduced into the reactor, or 0.1% to 3.0%, or 0.5% to 5.0%, or 0.5% to 3.0%. In this discussion, the temperature of the coking zone is defined as average measured fluid-bed temperature within the coking zone. The upper end of the injection of oxygen is limited by the explosion limit and by the wet gas compression and/or gas plant capability to process the resulting flue gas with the products from the coker.

Operating a fluidized coking system with a higher temperature in the stripping zone than the cracking zone can result in increased liquid yields when coking a feedstock. Liquid products are defined as products that are liquids at ambient conditions, which corresponds to $C_{5+}$ hydrocarbons. In some aspects, the liquid product yield can be increased by 0.5 wt % or more, or 1.0 wt % or more, or 1.5 wt % or more, relative to a liquid product yield when performing stripping with the same volume of steam as a stripping gas. This increase in liquid product yield can be based in part on a reduction in the yield of light gas yield ($C_{4-}$) and/or a reduction in coke yield. Conventionally, introduction of oxygen into a fluidized coking reaction zone environment has been not favored, due in part to concerns that product yields would be reduced due to oxidation.

In some aspects, it may be desirable to use multiple injection points when using an oxygen-containing gas as a stripping gas. Without being bound by any particular theory, it is believed that the reaction of oxygen with coke and/or hydrocarbons in the stripping zone is relatively rapid, with substantially all of the oxygen being consumed before the stripping gas passes from the stripping zone to the coking zone. Due to the relatively rapid reaction rate, using multiple injection points for an oxygen-containing stripping gas can provide improved temperature distribution within the portion of the fluidized bed that is in the stripping zone. In some aspects, air can be injected into the stripping zone using existing stripping steam line(s) and/or common stream lines. Dilution with steam can further help to reduce or minimize the chance for a hot spot formation or for reaching the explosion limit inside the coker reactor.

Other potential benefits of using an oxygen-containing stripping gas can be related to the products generated. In addition to improving liquid yield, adding an oxygen-containing gas to the stripping zone can help to further reduce or minimize coke formation on the surfaces of the stripping zone. The nature of the gas phase products generated can also be modified. Due to the presence of a substantial excess of hydrocarbons in the stripping zone, the reaction of oxygen with coke and hydrocarbons in the stripping zone occurs under conditions that can resemble reducing conditions, as opposed to the typical oxidizing conditions of a typical burner environment. As a result, the nitrogen-containing and sulfur-containing species generated in the stripping zone can primarily correspond to $NH_3$ and $H_2S$, rather than $NO_x$ and $SO_x$. $NH_3$ and $H_2S$ are already a byproduct of the coking reaction and therefore is easily handled within the current design of the coker separation system.

The introduction of oxygen-containing gas into the stripping zone can also result in reaction with a portion of the hydrogen-rich compounds that might remain with the coke particles after a typical stripping operation. As a result, in configurations where a gasifier is used of oxidation of coke, after transfer of the coke particles to the gasifier, the net amount of methane generated in the gasifier can be reduced. This can result in a gasifier flue gas with an increased suitability for use in some applications, such as use of the flue gas as a syngas feed.

In some aspects, the stripping gas can include a portion of oxygen-containing gas and a portion of steam. In other aspects, the stripping gas can correspond to a gas without added steam. In such aspects where steam is not added to the stripping gas, various costs of operating a fluidized coking system can be reduced or minimized. For example, a stripping gas that does not contain added steam can reduce or minimize the production of sour water from the fluidized coking system. Sour water is a side product of conventional fluidized coking systems, and proper cleaning and disposal of sour water represents a portion of the cost of operation. Reducing or minimizing the production of sour water by avoiding the addition of steam can allow for reduced or minimized need to handle and/or dispose of the sour water. Due to the relatively high heat capacity of water, any steam present in the fluidized coking system adds to the energy requirements. Additionally, when attempting to condense the fluidized coking products for further processing, any steam that is mixed with the coking products can require additional heat exchange area and/or cooling media. By avoiding the addition of steam to the stripping gas, the size and/or operating load on the cooling towers, BFW (boiler feed water) production, and steam generation associated with the fluidized coking system can be reduced or minimized. In various aspects where the amount of added stream in the stripping gas is reduced or minimized, the amount of added steam in the stripping gas can be 99 vol % or less of the stripping gas, or 50 vol % or less, or 25 vol % or less, or 5.0 vol % or less. In some aspects, the stripping gas can be substantially free of added steam, so that added steam or water vapor corresponds to less than 0.5 vol % of the stripping gas. As used herein, added steam refers to steam and/or water that is added to the stripping gas independently of the oxygen-containing gas. For example, when air is used as the stripping gas, any moisture present in the air is not considered added steam.

In some aspects, the inclusion of oxygen in the stripping gas can be performed in conjunction with a fluidized coking configuration where partially oxidized particles from the gasifier and/or burner (such as partially oxidized coke particles) are returned to the coking zone of the reactor. Optionally but preferable, the partially oxidized particles can be returned to the coking zone without externally passing the partially oxidized particles into the stripping zone. Due to mixing within the fluidized coking reactor, the particles within the coking zone and the stripping zone will mix. However, using an oxygen-containing gas as part of the stripping gas can avoid the need for the extra piping and complexity that is required for introducing partially oxidized particles into the stripping zone rather than the coking zone.

In this discussion, liquid product yield is defined as yield of $C_{5+}$ products (excluding coke), as such products are typically liquid at standard conditions (25° C., 101 kPa-a).

Fluidized Coking with Integrated Gasification

In this description, the term "Flexicoking" (trademark of ExxonMobil Research and Engineering Company) is used to designate a fluid coking process in which heavy petroleum feeds are subjected to thermal cracking in a fluidized bed of heated solid particles to produce hydrocarbons of lower molecular weight and boiling point along with coke as a by-product which is deposited on the solid particles in the fluidized bed. The resulting coke can then converted to a fuel gas by contact at elevated temperature with steam and an oxygen-containing gas in a gasification reactor (gasifier). This type of configuration can more generally be referred to as an integration of fluidized bed coking with gasification. It is noted that a gasifier is described herein as an example of a suitable burner or gasifier for use in a fluidized coking system. In some aspects, an oxygen-containing stripping gas can be used in a fluidized coking system that includes a burner for regeneration of the fluidized bed particles.

In some aspects, an integrated fluidized bed coker and gasifier, optionally also including a heater, can be used to process a feed by first coking the feed and then gasifying the resulting coke. This can generate a fuel gas product (withdrawn from the gasifier or the optional heater) that can then be further processed, for example, to increase the concentration of synthesis gas in the product.

Figure 1:
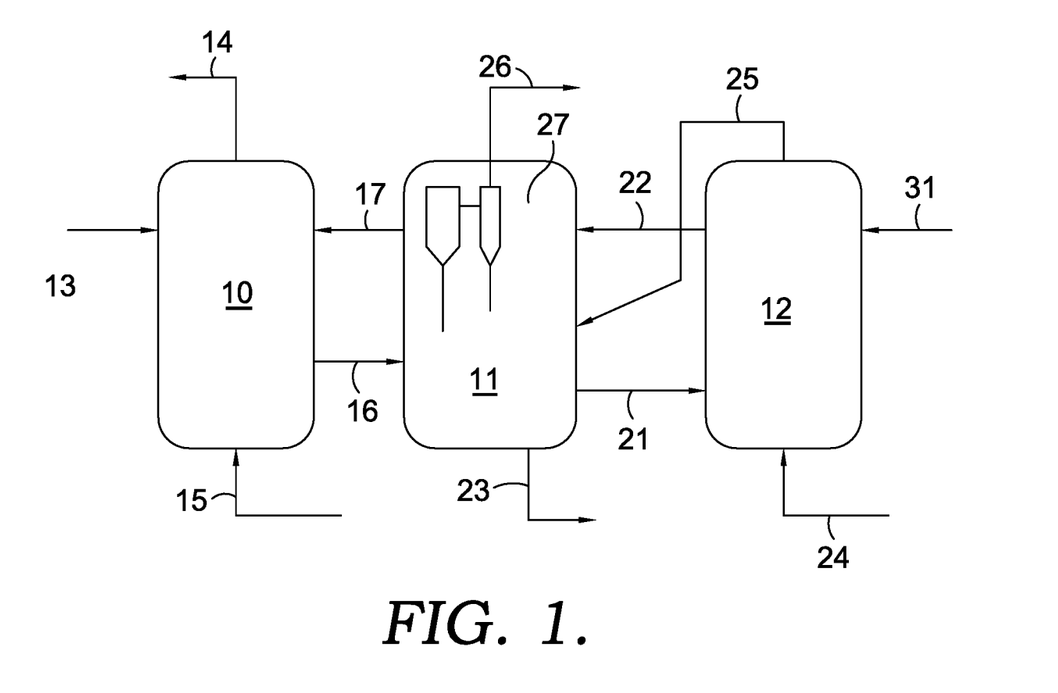
FIG. 1 shows an example of a fluidized bed coking system including a coker, a heater, and a gasifier.

FIG. 1 shows an example of a Flexicoker unit (i.e., a system including a gasifier that is thermally integrated with a fluidized bed coker) with three reaction vessels: reactor, heater and gasifier. The unit comprises reactor section 10 with the coking zone and its associated stripping and scrubbing sections (not separately indicated), heater section 11 and gasifier section 12. The relationship of the coking zone, scrubbing zone and stripping zone in the reactor section is shown, for example, in U.S. Pat. No. 5,472,596, to which reference is made for a description of the Flexicoking™ unit and its reactor section. A heavy oil feed is introduced into the unit by line 13 and cracked hydrocarbon product withdrawn through line 14. Fluidizing and stripping gas is supplied by line 15. In various aspects, the fluidizing and stripping gas can correspond to an oxygen-containing gas (such as air), a mixture of oxygen-containing gas and steam, or another convenient gas that includes an oxygen-containing gas portion. Cold coke is taken out from the stripping section at the base of reactor 10 by means of line 16 and passed to heater 11. The term "cold" as applied to the temperature of the withdrawn coke is, of course, decidedly relative since it is well above ambient at the operating temperature of the stripping section. Hot coke is circulated from heater 11 to reactor 10 through line 17. Coke from heater 11 is transferred to gasifier 12 through line 21 and hot, partly gasified particles of coke are circulated from the gasifier back to the heater through line 22. The excess coke is withdrawn from the heater 11 by way of line 23. In conventional configurations, gasifier 12 is typically provided with its supply of steam and air by line 24 and hot fuel gas is taken from the gasifier to the heater though line 25. The fuel gas is taken out from the unit through line 26 on the heater; coke fines are removed from the fuel gas in heater cyclone system 27 comprising serially connected primary and secondary cyclones with diplegs which return the separated fines to the fluid bed in the heater. The fuel gas from line 26 can then undergo further processing for separation of $CO_2$ (and/or $H_2S$), such as in preparation for further use of the fuel gas as a source of synthesis gas.

It is noted that in some optional aspects, heater cyclone system 27 can be located in a separate vessel (not shown) rather than in heater 11. In such aspects, line 26 can withdraw the fuel gas from the separate vessel, and the line 23 for purging excess coke can correspond to a line transporting coke fines away from the separate vessel. These coke fines and/or other partially gasified coke particles that are vented from the heater (or the gasifier) can have an increased content of metals relative to the feedstock. For example, the weight percentage of metals in the coke particles vented from the system (relative to the weight of the vented particles) can be greater than the weight percent of metals in the feedstock (relative to the weight of the feedstock). In other words, the metals from the feedstock are concentrated in the vented coke particles. Since the gasifier conditions avoid the creation of slag, the vented coke particles correspond to the mechanism for removal of metals from the coker/gasifier environment. In some aspects, the metals can correspond to a combination of nickel, vanadium, and/or iron. Additionally or alternately, the gasifier conditions can cause substantially no deposition of metal oxides on the interior walls of the gasifier, such as deposition of less than 0.1 wt % of the metals present in the feedstock introduced into the coker/gasifier system, or less than 0.01 wt %.

In configurations such as FIG. 1, the system elements shown in the figure can be characterized based on fluid communication between the elements. For example, reactor section 10 is in direct fluid communication with heater 11. Reactor section 10 is also in indirect fluid communication with gasifier 12 via heater 11.

As an alternative, integration of a fluidized bed coker with a gasifier can also be accomplished without the use of an intermediate heater. In such alternative aspects, the cold coke from the reactor can be transferred directly to the gasifier. This transfer, in almost all cases, will be direct with one end of the tubular transfer line connected to the coke outlet of the reactor and its other end connected to the coke inlet of the gasifier with no intervening reaction vessel, i.e. heater. The presence of devices other than the heater is not however to be excluded, e.g. inlets for lift gas etc. Similarly, while the hot, partly gasified coke particles from the gasifier are returned directly from the gasifier to the reactor this signifies only that there is to be no intervening heater as in the conventional three-vessel Flexicoker but that other devices may be present between the gasifier and the reactor, e.g. gas lift inlets and outlets.

Figure 2:
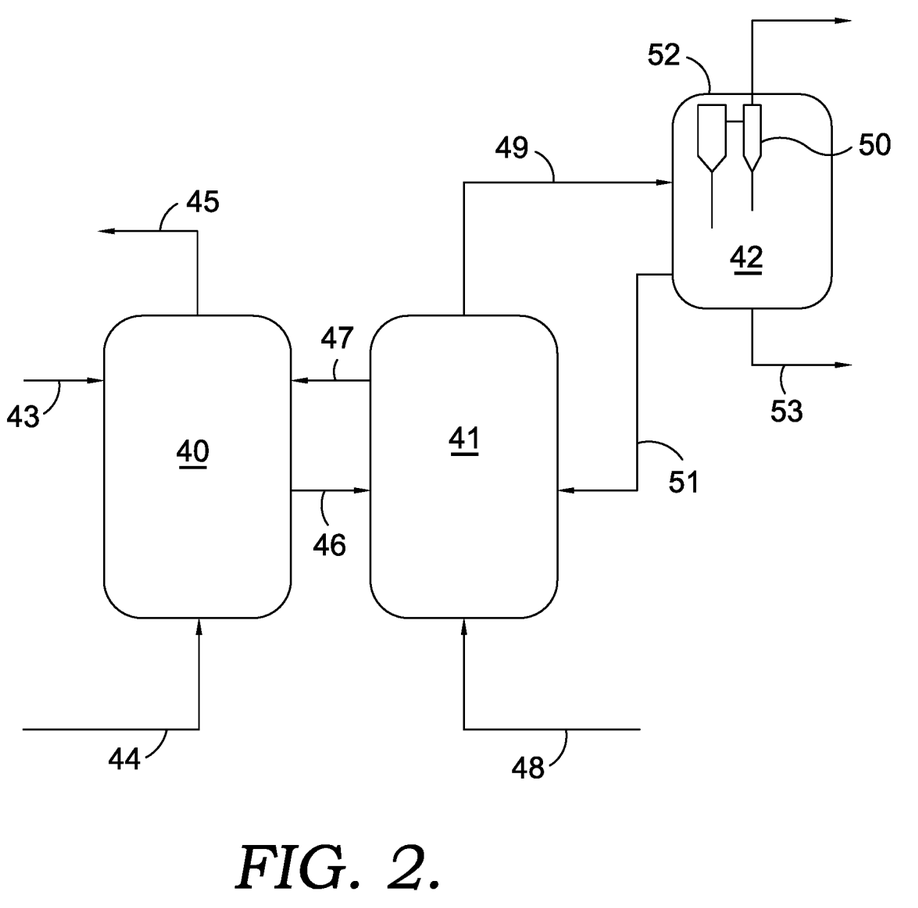
FIG. 2 shows an example of a fluidized bed coking system including a coker and a gasifier.

FIG. 2 shows an example of integration of a fluidized bed coker with a gasifier but without a separate heater vessel. In the configuration shown in FIG. 2, the cyclones for separating fuel gas from catalyst fines are located in a separate vessel. In other aspects, the cyclones can be included in gasifier vessel 41.

In the configuration shown in FIG. 2, the configuration includes a reactor 40, a main gasifier vessel 41 and a separator 42. The heavy oil feed is introduced into reactor 40 through line 43 and fluidizing/stripping gas through line 44; cracked hydrocarbon products are taken out through line 45. In various aspects, the fluidizing and stripping gas can correspond to an oxygen-containing gas (such as air), a mixture of oxygen-containing gas and steam, or another convenient gas that includes an oxygen-containing gas portion. Cold, stripped coke is routed directly from reactor 40 to gasifier 41 by way of line 46 and hot coke returned to the reactor in line 47. Steam and oxygen are supplied through line 48. The flow of gas containing coke fines is routed to separator vessel 42 through line 49 which is connected to a gas outlet of the main gasifier vessel 41. The fines are separated from the gas flow in cyclone system 50 comprising serially connected primary and secondary cyclones with diplegs which return the separated fines to the separator vessel. The separated fines are then returned to the main gasifier vessel through return line 51 and the fuel gas product taken out by way of line 52. Coke is purged from the separator through line 53. The fuel gas from line 52 can then undergo further processing for separation of $CO_2$ (and/or $H_2S$), such as in preparation for use of a remaining portion of the fuel gas as syngas.

Figure 3:
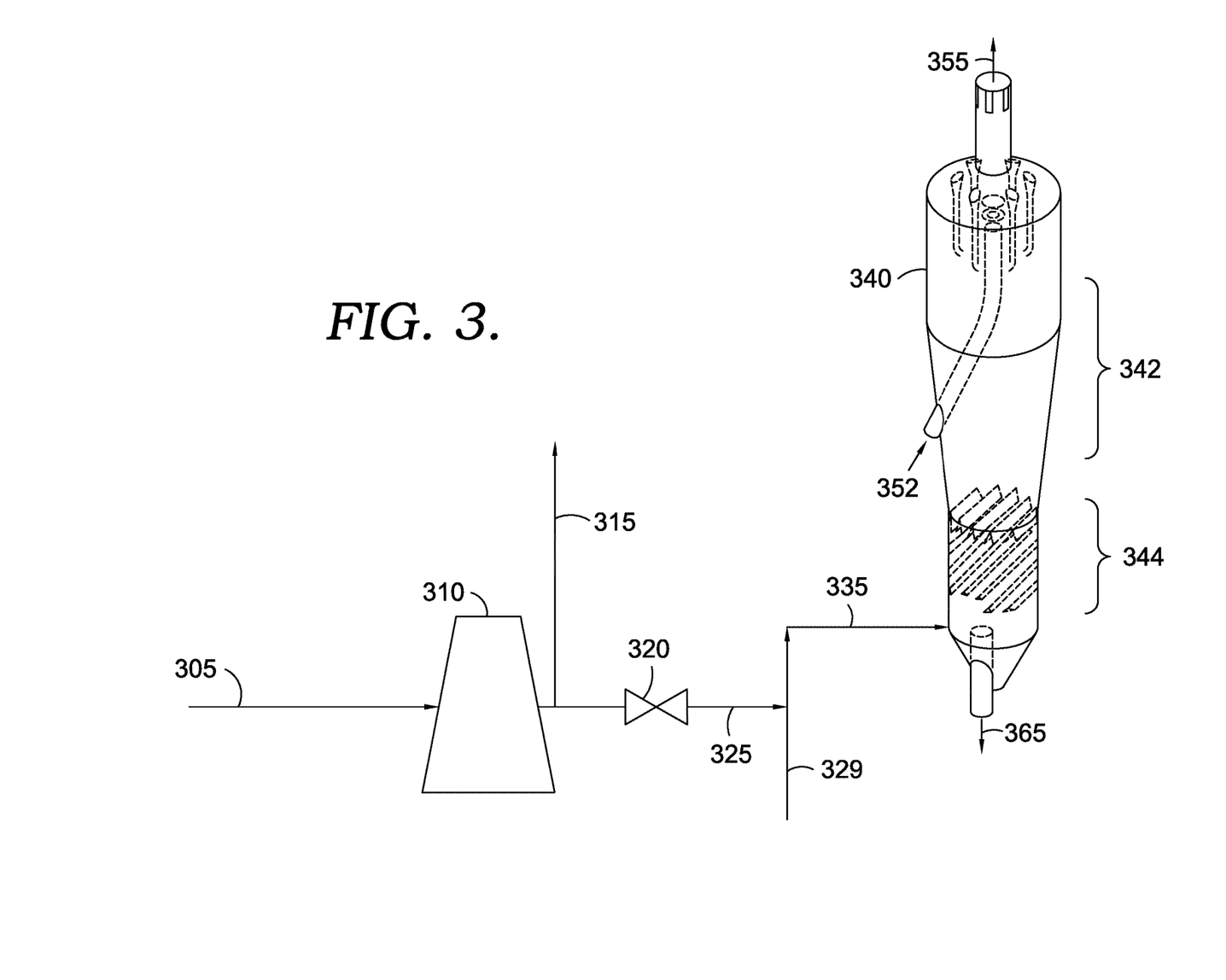
FIG. 3 shows additional details for a fluidized coking configuration that uses oxygen-containing gas as at least a portion of the stripping gas.

FIG. 3 shows an example of a portion of a fluidized coker configuration that can be suitable when using an oxygen-containing gas as at least part of the stripping gas. In the example configuration shown in FIG. 3, air is used as the stripping gas. In FIG. 3, air 305 can be heated and compressed 310. A portion 315 of the air can be used as air for a burner or gasifier (not shown) associated with the fluidized coking system. Another portion 325 of the air can be passed through a shut-off valve 320 prior to mixing portion 325 of air with steam 329. Shut-off valve can be used to reduce or eliminate the flow of oxygen into the stripper if an undesirable condition is detected within the reactor. The mixture 335 of air and steam can then be introduced into the stripping zone 344 of fluidized coking reactor 340. During operation of fluidized coking reactor 340, feedstock (not shown) can be introduced into coking zone 342 along with hot coke 352 from the burner or gasifier. This can generate an overhead product 355 and stream 365 of particles that include deposited coke that can be sent to the burner or gasifier for regeneration.

The coker and gasifier can be operated according to the parameters necessary for the required coking processes. Thus, the heavy oil feed will typically be a heavy (high boiling) reduced petroleum crude; petroleum atmospheric distillation bottoms; petroleum vacuum distillation bottoms, or residuum; pitch; asphalt; bitumen; other heavy hydrocarbon residues; tar sand oil; shale oil; or even a coal slurry or coal liquefaction product such as coal liquefaction bottoms. Such feeds will typically have a Conradson Carbon Residue (ASTM D189-165) of at least 5 wt. %, generally from about 5 to 50 wt. %. Preferably, the feed is a petroleum vacuum residuum.

A typical petroleum chargestock suitable for processing in a fluidized bed coker can have a composition and properties within the ranges set forth below.

TABLE 1

| Example of Coker Feedstock | | |
| --- | --- | --- |
| Conradson Carbon | 5 to 40 | wt. % |
| API Gravity | −10 to 35° | |
| Boiling Point | 340° C.+ to 650° C.+ | |
| Sulfur | 1.5 to 8 | wt. % |
| Hydrogen | 9 to 11 | wt. % |
| Nitrogen | 0.2 to 2 | wt. % |
| Carbon | 80 to 86 | wt. % |
| Metals | 1 to 2000 | wppm |

More generally, the feed to the fluidized bed coker can have a T10 distillation point of 343° C. or more, or 371° C. or more.

The heavy oil feed, pre-heated to a temperature at which it is flowable and pumpable, is introduced into the coking reactor towards the top of the reactor vessel through injection nozzles which are constructed to produce a spray of the feed into the bed of fluidized coke particles in the vessel. Temperatures in the coking zone of the reactor are typically in the range of about 450° C. to about 850° C. and pressures are kept at a relatively low level, typically in the range of about 120 kPag to about 400 kPag (about 17 psig to about 58 psig), and most usually from about 200 kPag to about 350 kPag (about 29 psig to about 51 psig), in order to facilitate fast drying of the coke particles, preventing the formation of sticky, adherent high molecular weight hydrocarbon deposits on the particles which could lead to reactor fouling. The conditions can be selected so that a desired amount of conversion of the feedstock occurs in the fluidized bed reactor. The coking reaction and the amount of conversion can be selected to be similar to the values used in a conventional fluidized coking reaction. For example, the conditions can be selected to achieve at least 10 wt % conversion relative to 343° C. (or 371° C.), or at least 20 wt % conversion relative 343° C. (or 371° C.), or at least 40 wt % conversion relative to 343° C. (or 371° C.), such as up to 80 wt % conversion or possibly still higher. The light hydrocarbon products of the coking (thermal cracking) reactions vaporize, mix with the fluidizing steam and pass upwardly through the dense phase of the fluidized bed into a dilute phase zone above the dense fluidized bed of coke particles. This mixture of vaporized hydrocarbon products formed in the coking reactions flows upwardly through the dilute phase with the steam at superficial velocities of about 1 to 2 meters per second (about 3 to 6 feet per second), entraining some fine solid particles of coke which are separated from the cracking vapors in the reactor cyclones as described above. The cracked hydrocarbon vapors pass out of the cyclones into the scrubbing section of the reactor and then to product fractionation and recovery.

As the cracking process proceeds in the reactor, the coke particles pass downwardly through the coking zone, through the stripping zone, where occluded hydrocarbons are stripped off by the ascending current of fluidizing gas (steam). They then exit the coking reactor and pass to the gasification reactor (gasifier) which contains a fluidized bed of solid particles and which operates at a temperature higher than that of the reactor coking zone. In the gasifier, the coke particles are converted by reaction at the elevated temperature with steam and an oxygen-containing gas into a fuel gas comprising carbon monoxide and hydrogen.

The gasification zone is typically maintained at a high temperature ranging from about 850° C. to about 1000° C. (about 1560° F. to 1830° F.) and a pressure ranging from about 0 kPag to about 1000 kPag (about 0 psig to about 150 psig), preferably from about 200 kPag to about 400 kPag (about 30 psig to about 60 psig). Steam and an oxygen-containing gas having a low nitrogen content, such as oxygen from an air separation unit or another oxygen stream including 95 vol % or more of oxygen, or 98 vol % or more, are passed into the gasifier for reaction with the solid particles comprising coke deposited on them in the coking zone. A separate diluent stream, such as a recycled $CO_2$ or $H_2S$ stream derived from the fuel gas produced by the gasifier, can also be passed into the gasifier. The amount of diluent can be selected by any convenient method. For example, the amount of diluent can be selected so that the amount of diluent replaces the weight of $N_2$ that would be present in the oxygen-containing stream if air was used as the oxygen-containing stream. As another example, the amount of diluent can be selected to allow for replacement of the same BTU value for heat removal that would be available if $N_2$ was present based on use of air as the oxygen-containing stream. These types of strategy examples can allow essentially the same or a similar temperature profile to be maintained in the gasifier relative to conventional operation.

In the gasification zone the reaction between the coke and the steam and the oxygen-containing gas produces a hydrogen and carbon monoxide-containing fuel gas and a partially gasified residual coke product. Conditions in the gasifier are selected accordingly to generate these products. Steam, oxygen, and $CO_2$ rates will depend upon the rate at which cold coke enters from the reactor and to a lesser extent upon the composition of the coke which, in turn will vary according to the composition of the heavy oil feed and the severity of the cracking conditions in the reactor with these being selected according to the feed and the range of liquid products which is required. The fuel gas product from the gasifier may contain entrained coke solids and these are removed by cyclones or other separation techniques in the gasifier section of the unit; cyclones may be internal cyclones in the main gasifier vessel itself or external in a separate, smaller vessel as described below. The fuel gas product is taken out as overhead from the gasifier cyclones. The resulting partly gasified solids are removed from the gasifier and introduced directly into the coking zone of the coking reactor at a level in the dilute phase above the lower dense phase.

ADDITIONAL EMBODIMENTS

Embodiment 1

A method for performing fluidized coking, comprising: exposing a feedstock comprising a T10 distillation point of 343° C. or more to a first portion of a fluidized bed comprising solid particles in a coking zone of a reactor under thermal cracking conditions to form a 343° C.-liquid product, the thermal cracking conditions being effective for depositing coke on the solid particles; introducing an oxygen-containing stream into a stripping zone of the reactor, the stripping zone comprising a second portion of the fluidized bed, under stripping conditions to oxidize at least a first portion of the deposited coke, a stripping temperature of the stripping conditions being greater than a cracking temperature of the thermal cracking conditions; passing at least a portion of the solid particles comprising deposited coke from the reactor to at least one of a gasifier and a burner; exposing the at least a portion of the solid particles comprising deposited coke to oxidation conditions in the at least one of a gasifier and a burner to form partially oxidized coke particles and a gas phase product comprising CO and $CO_2$; removing at least a first portion of the partially oxidized solid particles from the at least one of a gasifier and a burner; and passing at least a second portion of the partially oxidized solid particles into the coking zone of the reactor, wherein the solid particles optionally comprise coke particles.

Embodiment 2

The method of Embodiment 1, wherein the oxygen-containing stream comprises 50 vol % or more of air.

Embodiment 3

The method of any of the above embodiments, wherein the oxygen-containing stream is substantially free of added steam; or wherein the oxygen-containing stream comprises 49 vol % or less of added steam.

Embodiment 4

The method of any of the above embodiments, wherein a molar flow rate of the oxygen in the oxygen-containing stream comprises 0.1% to 10.0% of a molar flow rate of the feedstock.

Embodiment 5

The method of any of the above embodiments wherein the stripping temperature is greater than the cracking temperature by 3° C. to 14° C.; or wherein the stripping temperature is greater than the cracking temperature by 15° C. to 60° C.

Embodiment 6

The method of any of the above embodiments, wherein the stripping temperature is greater than the cracking temperature by 5° C. to 22° C.

Embodiment 7

The method of any of the above embodiments, wherein the stripping conditions further comprise oxidizing hydrocarbons in the second portion of the fluidized bed.

Embodiment 8

The method of any of the above embodiments, i) wherein the at least a second portion of the partially oxidized solid particles are passed into the coking zone of the reactor without externally passing partially oxidized solid particles into the stripping zone of the reactor; ii) wherein the reactor does not include a baffle between the coking zone and the stripping zone; or iii) a combination of i) and ii).

Embodiment 9

The method of any of the above embodiments, wherein the oxygen-containing gas is passed into the stripping zone at a plurality of locations.

Embodiment 10

The method of any of the above embodiments, wherein the at least a portion of the solid particles comprising deposited coke are passed into a gasifier, wherein the oxidation conditions comprising gasification conditions, and wherein the gas phase product further comprising $H_2$.

Embodiment 11

The method of Embodiment 10, further comprising separating $CO_2$, $H_2S$, or a combination thereof from the gas phase product to form at least a synthesis gas stream.

Embodiment 12

The method of Embodiment 10 or 11, a) wherein passing at least a portion of the solid particles comprising deposited coke from the reactor to the gasifier comprises passing the at least a portion of the solid particles comprising deposited coke to a heater, and passing the at least a portion of the solid particles comprising deposited coke from the heater to the gasifier; b) wherein passing at least a second portion of the partially oxidized coke particles from the gasifier to the coking zone of the reactor comprises passing the at least a second portion of partially oxidized coke particles to a heater, and passing the at least a second portion of the partially oxidized coke particles from the heater to the coking zone of the reactor; or c) a combination of a) and b).

Embodiment 13

The method of any of the above embodiments, wherein the thermal cracking conditions, the stripping conditions, or a combination thereof comprise 10 wt % or more conversion of the feedstock relative to 343° C.

Embodiment 14

The method of any of the above embodiments, A) wherein the stripping gas comprises air, at least a portion of the air for the stripping gas and air for the gasifier and/or burner being originated from a common compressor; B) wherein the stripping gas comprises air and steam, the air and steam being supplied to the stripper at least in part through a common piping and distribution system; or C) a combination of A) and B).

Embodiment 15

A fluidized coking liquid product, a fluidized coking gas phase product, or combination thereof made according to the method of any of Embodiments 1-14.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for performing fluidized coking, comprising:
exposing a feedstock comprising a T10 distillation point of 343° C. or more to a first portion of a fluidized bed comprising solid particles in a coking zone of a reactor under thermal cracking conditions to form a 343° C.-liquid product, the thermal cracking conditions being effective for depositing coke on the solid particles;
introducing an oxygen-containing stream into a stripping zone of the reactor, the stripping zone comprising a second portion of the fluidized bed, under stripping conditions to oxidize at least a first portion of the deposited coke, a stripping temperature of the stripping conditions being greater than a cracking temperature of the thermal cracking conditions;

passing at least a portion of the solid particles comprising deposited coke from the reactor to at least one of a gasifier and a burner;

exposing the at least a portion of the solid particles comprising deposited coke to oxidation conditions in the at least one of a gasifier and a burner to form partially oxidized solid particles and a gas phase product comprising CO and $CO_2$;

removing at least a first portion of the partially oxidized solid particles from the at least one of a gasifier and a burner; and passing at least a second portion of the partially oxidized solid particles into the coking zone of the reactor.

2. The method of claim 1, wherein the oxygen-containing stream comprises 50 vol % or more of air.

3. The method of claim 1, wherein the oxygen-containing stream is substantially free of added steam.

4. The method of claim 1, wherein the oxygen-containing stream comprises 49 vol % or less of added steam.

5. The method of claim 1, wherein a molar flow rate of the oxygen in the oxygen-containing stream comprises 0.1% to 10.0% of a molar flow rate of the feedstock.

6. The method of claim 1, wherein the stripping temperature is greater than the cracking temperature by 3° C. to 14° C.

7. The method of claim 1, wherein the stripping temperature is greater than the cracking temperature by 15° C. to 60° C.

8. The method of claim 1, wherein the stripping temperature is greater than the cracking temperature by 5° C. to 22° C.

9. The method of claim 1, wherein the stripping conditions further comprise oxidizing hydrocarbons in the second portion of the fluidized bed.

10. The method of claim 1, wherein the at least a second portion of the partially oxidized solid particles are passed into the coking zone of the reactor without externally passing partially oxidized solid particles into the stripping zone of the reactor.

11. The method of claim 1, wherein the oxygen-containing gas is passed into the stripping zone at a plurality of locations.

12. The method of claim 1, wherein the at least a portion of the solid particles comprising deposited coke are passed into a gasifier, wherein the oxidation conditions comprise gasification conditions, and wherein the gas phase product further comprises $H_2$.

13. The method of claim 12, further comprising separating $CO_2$, $H_2S$, or a combination thereof from the gas phase product to form at least a synthesis gas stream.

14. The method of claim 12, wherein passing at least a portion of the solid particles comprising deposited coke from the reactor to the gasifier comprises passing the at least a portion of the solid particles comprising deposited coke to a heater, and passing the at least a portion of the solid particles comprising deposited coke from the heater to the gasifier.

15. The method of claim 12, wherein passing at least a second portion of the partially oxidized coke particles from the gasifier to the coking zone of the reactor comprises passing the at least a second portion of partially oxidized coke particles to a heater, and passing the at least a second portion of the partially oxidized coke particles from the heater to the coking zone of the reactor.

16. The method of claim 1, wherein the solid particles comprise coke particles.

17. The method of claim 1, wherein the thermal cracking conditions, the stripping conditions, or a combination thereof comprise 10 wt % or more conversion of the feedstock relative to 343° C.

18. The method of claim 1, wherein the stripping gas comprises air, at least a portion of the air for the stripping gas and air for the gasifier and/or burner being originated from a common compressor.

19. The method of claim 1, wherein the stripping gas comprises air and steam, the air and steam being supplied to the stripper at least in part through a common piping and distribution system.

20. The method of claim 1, wherein the reactor does not include a baffle between the coking zone and the stripping zone.

* * * * *